United States Patent
Roy et al.

[11] Patent Number: 5,341,177
[45] Date of Patent: Aug. 23, 1994

[54] SYSTEM TO CANCEL GHOSTS GENERATED BY MULTIPATH TRANSMISSION OF TELEVISION SIGNALS

[75] Inventors: Sumit Roy, Philadelphia, Pa.; Chandrakant B. Patel, Hopewell, N.J.; Jian Yang, Philadelphia, Pa.

[73] Assignee: SamSung Electronics Co., Ltd, Suwon, Rep. of Korea

[21] Appl. No.: 891,058

[22] Filed: Jun. 1, 1992

Related U.S. Application Data

[63] Continuation-in-part of Ser. No. 754,895, Sep. 4, 1991.

[51] Int. Cl.$^5$ .......................................... H04N 5/213
[52] U.S. Cl. .................................................. 348/614
[58] Field of Search ................. 358/905, 167, 36, 166, 358/37, 147; 348/614, 611, 607, 624, 478; 364/728.03, 724.12, 724.16, 724.17

[56] References Cited

U.S. PATENT DOCUMENTS

| | | | |
|---|---|---|---|
| 4,896,213 | 1/1990 | Kobo | 358/167 |
| 4,897,725 | 1/1990 | Tanaka | 358/167 |
| 5,111,298 | 5/1992 | Koo | 358/905 |
| 5,119,196 | 6/1992 | Ayanoglu | 358/905 |

Primary Examiner—James J. Groody
Assistant Examiner—Sherrie Hsia
Attorney, Agent, or Firm—Robert E. Bushnell

[57] ABSTRACT

A ghost-canceling reference signal for inclusion in a television signal is provided by cyclically inserting ones of extended-length complementary-sequence pairs into a prescribed scan line in each of the vertical blanking intervals of successive fields of the television signal. By definition, a pair of binary ($\pm 1$) sequences of similar length to each other are complementary sequences only if the sum of the linear autocorrelation functions of the sequences is identically zero for all shifts other than zero but provides a high correlation gain at zero shift. A television receiver is described for receiving television signals containing such ghost-canceling reference signals, separating the ghosted complementary-sequence pairs from the received television signals, linearly correlating the ghosted complementary-sequences with corresponding ghost-free complementary-sequences previously stored in the receiver, and adjusting the filtering parameters of ghost-canceling video filters in accordance with the sum of the linear correlation results.

16 Claims, 11 Drawing Sheets

| FOUR-FIELD SEQUENCE TEST SIGNAL | BURST PHASE | FIELD NO. | EIGHT-FIELD C-SEQUENCE GCR SIGNAL |
|---|---|---|---|
| S1 | + | F1 | +CS1 OF FIG. 2 |
| S2 | − | F2 | FIG. 3 PEDESTAL |
| S3 | − | F3 | +CS2 OF FIG. 4 |
| S4 | + | F4 | FIG. 5 PEDESTAL |
| S1 | + | F5 | FIG. 5 PEDESTAL |
| S2 | − | F6 | +CS1 |
| S3 | − | F7 | FIG. 3 PEDESTAL |
| S4 | + | F8 | +CS2 |

FIELD F6 HAS GCR SIGNAL LIKE FIG. 2, BUT HAS OPPOSITE BURST PHASE.

FIELD F8 HAS GCR SIGNAL LIKE FIG. 4, BUT HAS OPPOSITE BURST PHASE.

*Fig. 6*

| FOUR-FIELD SEQUENCE TEST SIGNAL | BURST PHASE | FIELD NO. | EIGHT-FIELD C-SEQUENCE GCR SIGNAL |
|---|---|---|---|
| S1 | + | F1 | +CS1 OF FIG. 2 |
| S2 | − | F2 | −CS1 OF FIG. 7 |
| S3 | − | F3 | +CS2 OF FIG. 4 |
| S4 | + | F4 | −CS2 OF FIG. 8 |
| S1 | + | F5 | −CS1 |
| S2 | − | F6 | +CS1 |
| S3 | − | F7 | −CS2 |
| S4 | + | F8 | +CS2 |

FIELD F5 HAS GCR SIGNAL LIKE FIG. 7, BUT HAS OPPOSITE BURST PHASE.

FIELD F6 HAS GCR SIGNAL LIKE FIG. 2, BUT HAS OPPOSITE BURST PHASE.

FIELD F7 HAS GCR SIGNAL LIKE FIG. 8, BUT HAS OPPOSITE BURST PHASE.

FIELD F8 HAS GCR SIGNAL LIKE FIG. 4, BUT HAS OPPOSITE BURST PHASE.

*Fig. 9*

SYSTEM TO CANCEL GHOSTS GENERATED BY MULTIPATH TRANSMISSION OF TELEVISION SIGNALS

FIELD OF THE INVENTION

This is a continuation-in-part of U.S. patent application Ser. No. 07/754,895 filed Sep. 4, 1991.

The current inventions relate generally to a system, apparatus and method for improving the quality of television pictures and more particularly to the reduction or elimination of ghost images.

BACKGROUND OF THE INVENTION

The multipath reception of NTSC television images, commonly referred to as "ghosting", is a widespread problem both for signals received directly off-air and for signals received from cable TV systems. Recent advances in digital signal processing technology make it both practical and economical to implement a ghost-canceling system in consumer television receivers that will eliminate, or at least substantially reduce, the deleterious effects of multipath reception.

The signal to which the television receiver synchronizes is called the reference signal, and the reference signal is usually the direct signal received over the shortest transmission path. The multipath signals received over other paths are thus usually delayed with respect to the reference signal and appear as trailing ghost images. It is possible however, that the direct or shortest path signal is not the signal to which the receiver synchronizes. Where the receiver synchronizes to a reflected (longer path) signal, there will be a leading ghost image caused by the direct signal, or there will a plurality of leading ghosts caused by the direct signal and other reflected signals of lesser delay than the reflected signal to which the receiver synchronizes. The multipath signals vary in number, amplitude and delay time from location to location and from channel to channel at a given location.

The visual effects of multipath distortion can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. Usually the direct signal predominates and a receiver is synchronized to the direct signal, and the ghost images are displaced to the right at varying position, intensity and polarity. These are known as trailing ghosts or "post-ghost" images. When the receiver synchronizes to a reflected signal, there will be one or more ghost images displaced to the left of the reference image. These are known as leading ghosts or "pre-ghost" images.

Multipath signals of relatively short delay with respect to the reference signal do not cause separately discernible copies of the predominant image, but introduce distortion into the frequency response characteristic of the channel. The visual effect in this case is observed as increased or decreased sharpness of the image and in some cases loss of some image information. These short-delay or close-in ghosts are most commonly caused by unterminated or incorrectly terminated radio frequency transmission lines such as antenna lead-ins or cable television drop cables. In a cable television environment, it is possible to have multiple close-in ghosts caused by multiple distortion taps and multiple improperly terminated drop cables of varying lengths. Such multiple close-in ghosts are frequently referred to as "micro-ghosts".

The phenomenon of television ghosts has been addressed with a view to improving picture quality by reducing or eliminating ghosts. See, for example, "A Tutorial On Ghost Canceling In Television Receivers" by W. Ciciora et al., published February 1979 in the IEEE Transactions On Consumer Electronics, volume CE-25, pages 9–43. Other solutions to the problem of ghosts are described in U.S. Pat. No. 4,896,213 issued Jan. 23, 1990 to Kobo et al. and U.S. Pat. No. 4,897,725 issued Jan. 30, 1990, to Tanaka et al., the disclosures of which patents are incorporated herein by reference.

Since the characteristics of a transmitted television signal are known a priori, at least in theory it is possible to utilize such characteristics in a system of ghost signal detection and cancellation. Nevertheless, various problems limit this approach. Instead, it has been found desirable to transmit repeatedly a reference signal situated, for example, in a section of television signal that is currently unused for video purposes and to use this reference signal for detection and cancellation of ghost signals. Typically, lines in the vertical blanking interval (VBI) are used. Such a signal is herein referred to as a Ghost Canceling Reference (i.e., a "GCR") signal.

The strategy for eliminating ghosts in a television receiver relies on the transmitted GCR signal suffering the same multipath distortions as the rest of the television signal. The receiver can then examine the distorted GCR signal it receives and, with a priori knowledge of the waveform of a distortion-free GCR signal, can configure an adaptive filter to cancel, or at least significantly attenuate, the multipath distortion. It is important to choose a GCR signal that does not take up too much time in the VBI (preferably no more than one TV line), but that still contains sufficient information to permit the receiver to analyze the multipath distortion and configure an compensating filter to cancel the distortion.

It has been proposed that a useful test or GCR signal may appropriately exhibit a (sin x)/x waveform. Such a waveform, suitably windowed, exhibits a relatively constant spectral energy density over a frequency band of interest as noted in the paper by W. Ciciora et al. Ghost locations can then be determined for ghost signal cancellation to reduce the effects of long multipaths and waveform equalization to reduce the effects of short multipaths.

U.S. Pat. No. 4,896,213 to Kobo notes a ghost-canceling signal transmission/reception system which allows a built-in-ghost-canceling device to reduce or eliminate ghost components attributable to group-delay distortion and frequency-amplitude characteristic distortion generated in a signal transmission path. This is achieved by superimposing a digital signal on a television signal as a ghost-canceling reference signal. Thus, in U.S. Pat. No. 4.896,213, a digital signal composed of frame synchronizing signals, clock synchronizing signals, and data signals is generated, and is superposed, during the vertical blanking interval, on a television signal to be transmitted. At the receiving end, the digital signal superposed on the television signal is used as a reference signal in an arrangement that executes a correlative operation of the transmitted television signal to reduce the ghost phenomenon.

In the arrangement of U.S. Pat. No. 4,897,725 to Tanaka, a transmitted reference or GCR signal is also used. A dummy ghost signal is generated and is used for cancelling a ghost signal in the transmitted television signal. This is substantially the GCR signal proposal of the BTA in Japan, which uses as the main reference or deghosting signal a signal having the aforementioned (sin x)/x waveform, principally because its frequency spectral energy content is substantially flat across the entire video bandwidth. Averaging with a pair-wise constant signal is used for deriving a received reference waveform. The received reference waveform is Fourier transformed to provide a set of Fourier coefficients. The transformed reference waveform is then processed with an available fast Fourier transform (FFT) of an unimpaired GCR to compute the deghosting filter parameters, that is, tap gain information for both an infinite-impulse-response (IIR) filter (referred to as a deghosting filter) used to suppress macroghosts that occur after the predominant signal and for a finite-impulse-response (FIR) filter (referred to as a waveform-equalization filter) used to suppress microghosts.

As can be expected, the ghost cancelation reference signal is generally received accompanied by its ghost signals and is thus itself a "ghosted" signal. It is herein recognized that the performance of a ghost-canceling system is greatly influenced by the noise and perturbation content of the acquired GCR signal. It is also recognized that a reduction in the noise and perturbation content of the acquired GCR signal is desirable in improving the accuracy of the deghosting filter parameter derivations and in reducing the system complexity.

It is herein further recognized that a step in the signal leading edge is desirable in a GCR signal in computing ghost locations. As previously mentioned, a (sin x)/x waveform provides particular advantages in a GCR signal. Its flat frequency spectrum allows accurate computation of the filter parameters for attenuating multiple image effects as well as computation of the waveform equalizing parameters. The characteristic ripples of the (sin x)/x waveform however, along with other high frequency components, are typically attenuated in a received ghost GCR, owing to multipath effects as well as to to effects of antenna misorientation, each of which effects commonly occurs in practice. Under such conditions, the computation of the waveform equalizing parameters can be significantly in error.

David Sarnoff Research Center of Princeton N.J. has proposed the use of a pseudo-noise binary sequence transmitted during a VBI scan line in each frame as a GCR signal. The pseudo-noise binary sequence is transmitted on a pedestal. A corresponding pedestal, either being free of accompanying signal or having superposed thereon the same pseudo-noise binary sequence of opposite sense of polarity, can be transmitted during the corresponding VBI scan line in the other field of each frame. If this is done, differentially combining the signals transmitted during the corresponding VBI scan lines in the two fields of each frame recovers the pseudo-noise binary sequence and its ghosts without accompanying direct or color burst components or their ghosts. This cancellation occurs owing to what is referred to as "pair-wise-constant" signal processing. The pseudo-noise binary sequence and its ghosts can be correlated with the cyclically repeated ghost-free pseudo-noise binary sequence known a priori to obtain a set of pulses having strengths and spacings that characterize the relationships of the predominant pseudo-noise binary sequence and its ghosts in the time domain. This is a procedure referred to as "circular" correlation because of the cyclic nature of the correlation filter bed, each cycle of which conforms to the ghost-free pseudo-noise binary sequence. Circular correlation leads to the aliasing of ghosts that differ in time from the predominant signal by more than a cycle time, so the correlation result provides no basis for distinguishing such ghosts from ghosts differing in time from the predominant signal by less than a cycle time.

"Complementary sequences" are described by M. J. E. Golay in his paper "Complementary Series" published April 1961 in the IRE Transactions On Information Theory, volume IT-7, pages 82-87. C.-C. Tseng and C. L. Liu have further expanded the theory of complementary sequences in their paper "Complementary Sets of Sequences" published in September 1972 in the IEEE Transactions On Information Theory, volume IT-18, pages 644-652. By definition, a pair of binary ($\pm 1$) sequences of similar length of each other are complementary sequences only if the sum of the linear autocorrelation functions of the sequences is identically zero for all shifts other than zero, and provides a high correlation gain at zero shift. In linear correlation the correlation filter bed conforms to the sampled function against which correlation is made appearing a single time, being preceded by an "infinite" string of zeroes and being succeeded by an "infinite" string of zeroes.

Unlike ordinary pseudo-random binary sequences which exist only for lengths $N=2^n-1$, complementary sequences have a less stringent constraint on their lengths. Unfortunately, there exists no general method of finding complementary-sequence pairs for arbitrary lengths, and an exhaustive computer search quickly becomes impractical as the length increases. However, a property of complementary sequences proven by Tseng and Liu offers an efficient technique to synthesize longer length complementary-sequence pairs E and F from two known shorter length pairs (A,B) of length m and (C,D) of length n. The successive bits in sequence A are $a_1, a_2, \ldots a_{(m-1)}, a_m$. The successive bits in sequence B are $b_1, b_2, \ldots b_{(m-1)}, b_m$. The successive bits in sequence C are $c_1, c_2, \ldots c_{(n-1)}, c_n$. The successive bits in sequence D are $d_1, d_2, \ldots d_{(n-1)}, d_n$.

The successive bits in sequence E are $$(a_1c_1), \ldots (a_mc_1), (b_1d_1), \ldots (b_md_1), \ldots (a_1c_n) \ldots (a_mc_n), (b_1d_n), \ldots (b_md_n);$$

and the successive bits in sequence F are $$(a_1d_n), \ldots (a_md_n), (-b_1c_n), \ldots (-b_mc_n), \ldots (a_1d_1) \ldots (a_md_1), (-b_1c_1), \ldots (-b_mc_1) \quad (1)$$

where the bit $xy=x$ if $y=1$ and $xy=-x$ if $y=-1$.

Thus a length 2 mm complementary-sequence pair can be synthesized if length m and length n complementary-sequence pairs are known. By a computer search, primitive, complementary-sequence pairs of length 2, 4, 8, 10 are easily found. Thus, using equation (1), one can obtain complementary-sequence pairs of extended length $2^m 10^n$, where m and n are integers. Complementary sequence pairs of extended length 640, where m is 6 and n is 1, can be obtained, by way of example.

Another way to generate longer-length, ternary complementary-sequence pairs, the inventors find, is to expand shorter-length binary complementary-sequence pairs by inserting a prescribed number of null samples (zeros) between each +1 or −1 sample and the next +1 or −1 sample. The longer-length, ternary complementary-sequence pair results from subsampling and is therefore of reduced spatial bandwidth. Linear correlation filtering with the reduced spatial bandwidth. Linear correlation filtering with the reduced bandwidth kernel discards higher-spatial-frequency noise, resulting in somewhat improved signal-to-noise correlation filter responses obtaining when using the ternary complementary-sequence pair.

SUMMARY OF THE INVENTION

The invention is embodied in one of its aspects in ghost-canceling reference (GCR) signals wherein ones of extended-length complementary-sequence pairs are cyclically inserted into a prescribed scan line in the vertical blanking intervals of successive fields of a television signal.

The invention is embodied in another of its aspects in television receivers for receiving television signals containing such ghost-canceling reference signals, separating the ghosted complementary-sequence pairs from the received television signals, linearly correlating the ghosted complementary-sequences with corresponding ghost-free complementary-sequences previously stored in the receiver, and adjusting the filtering parameters of ghost-canceling video filters in accordance with the sum of the linear correlation results. Linear correlation does not lead to the aliasing of ghosts that differ in time from the predominant signal by more than a prescribed interval, one of the inventors discerned in the course of making the invention. There is no accumulation of noise caused by cyclic comparison of the ghosted signal with the function against which correlation is made.

BRIEF DESCRIPTION OF THE DRAWING

FIG. 6 is a table showing how a ghost-canceling reference signal may be formulated from the components of FIGS. 2–5 and from similar components except for the reversal of burst phasing.

FIGS. 2, 7, 4 and 8 are two-coordinate graphs illustrating components of an alternative ghost-canceling reference signal formulated according to aspects of the invention and inserted into selected vertical-blanking-interval scan lines appearing in successive fields of video information.

FIG. 9 is a table showing how a ghost-canceling reference signal may be formulated from the components of FIGS. 2, 7, 4 and 8 and from similar components except for the reversal of burst phasing.

DETAILED DESCRIPTION

Figure 1:
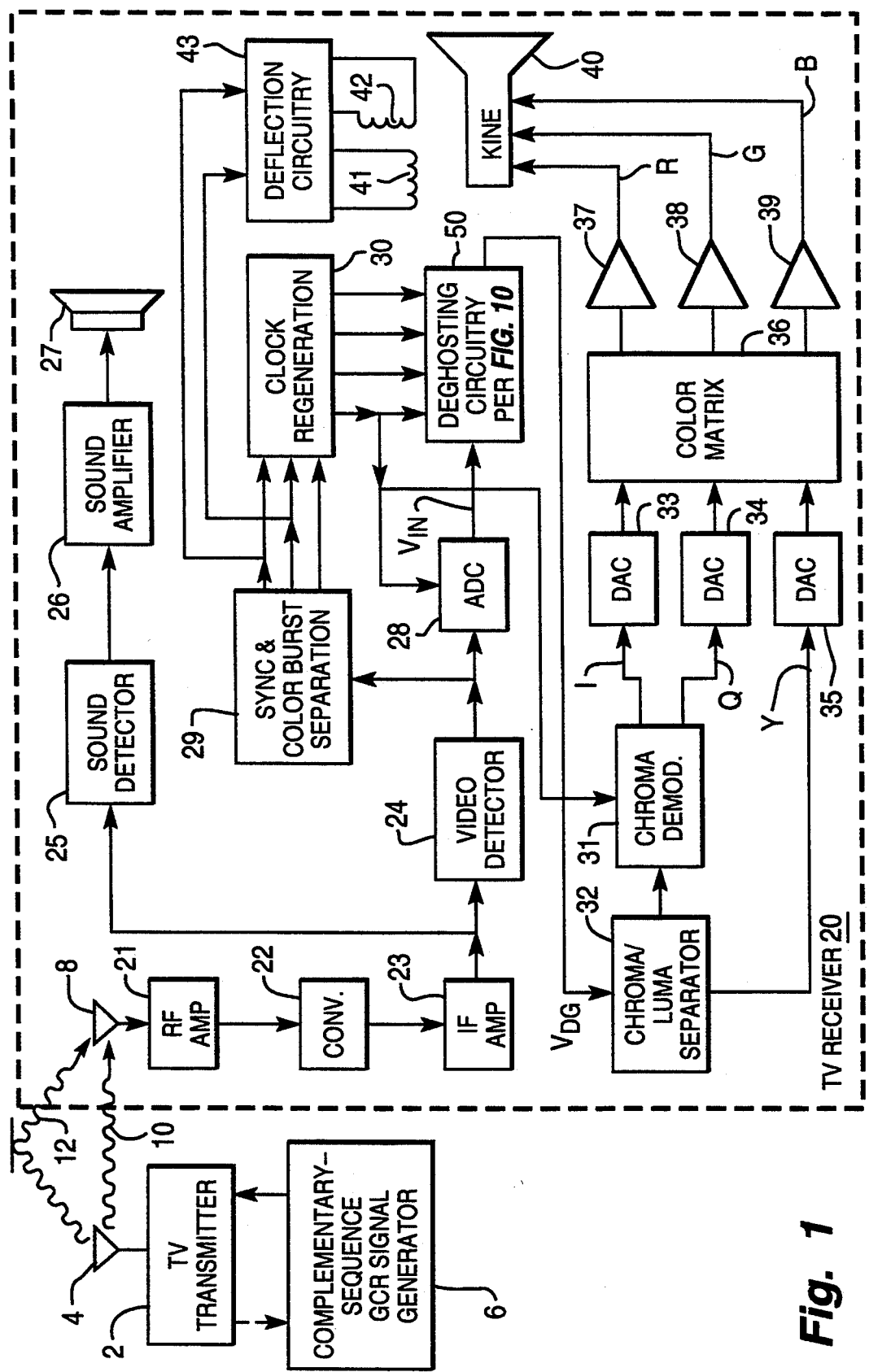
FIG. 1 is a schematic diagram of a television system constructed and operated in accordance with aspects of the invention, so as to cancel ghosts generated by the multipath transmission of television signals.
Figure 2:
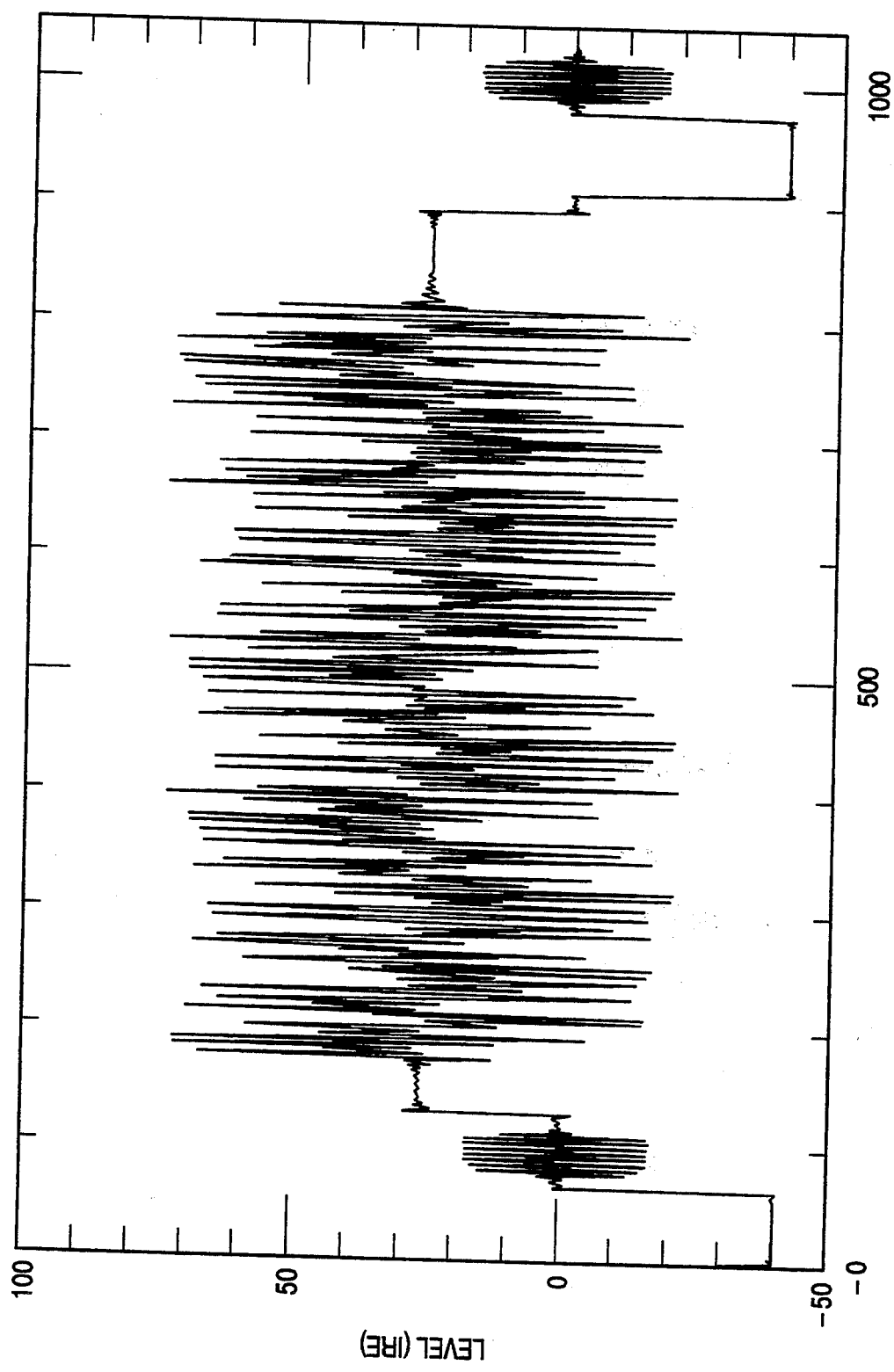
FIGS. 2–5 are two-coordinate graphs illustrating components of a ghost-canceling reference signal formulated according to an aspect of the invention and inserted into selected vertical-blanking-interval scan lines appearing in successive fields of video information.
Figure 3:
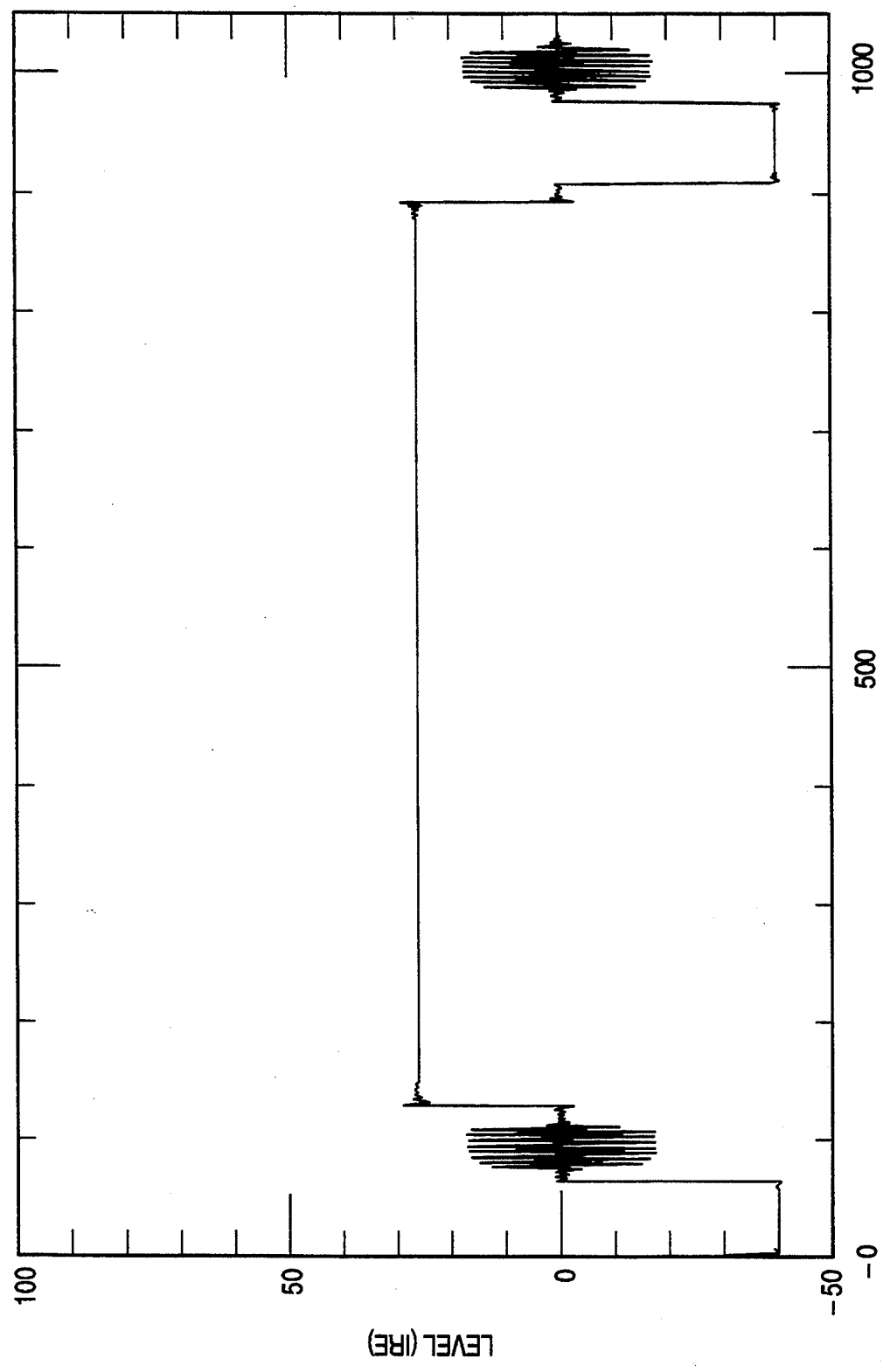
Figure 4:
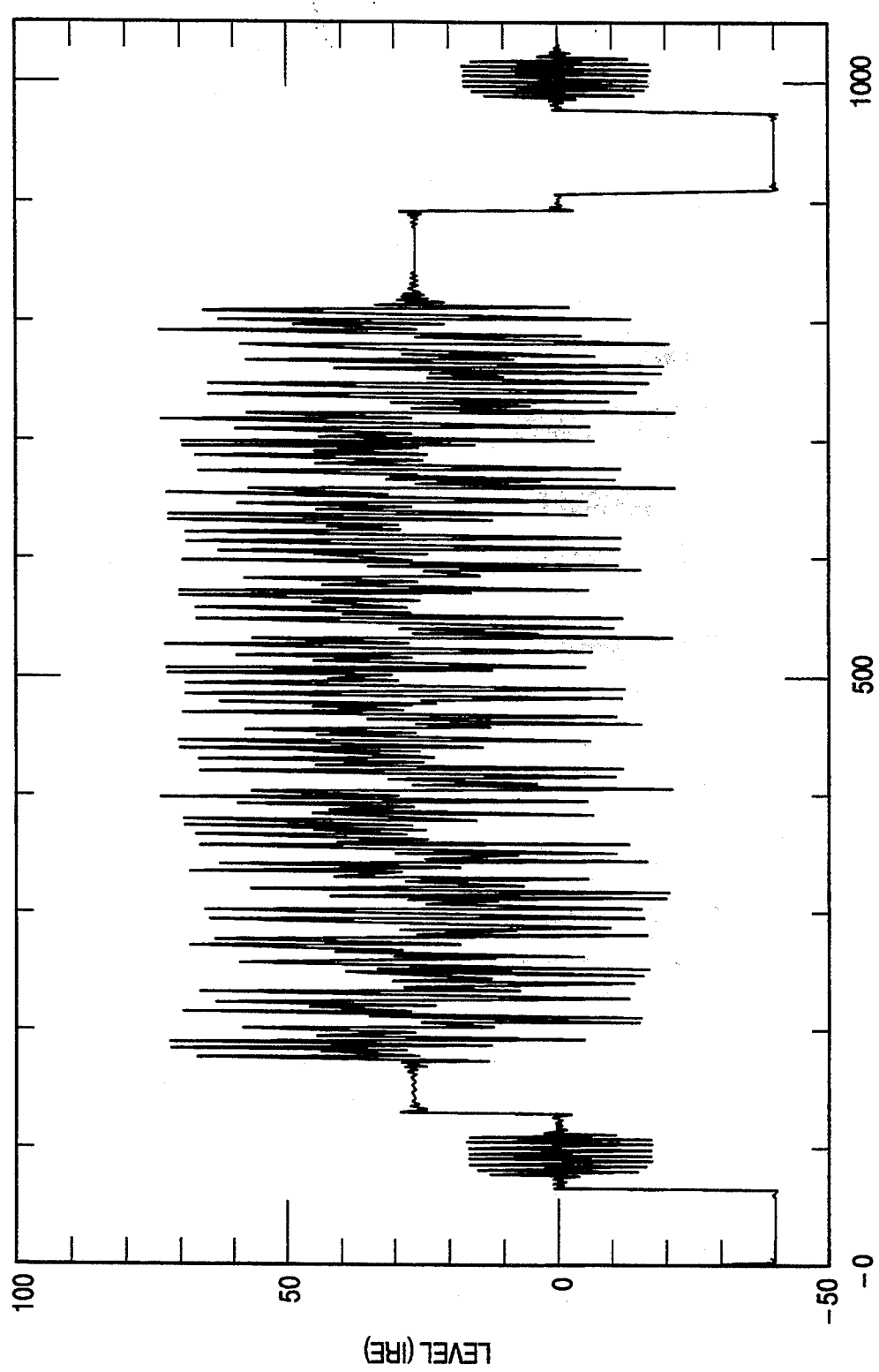
Figure 5:
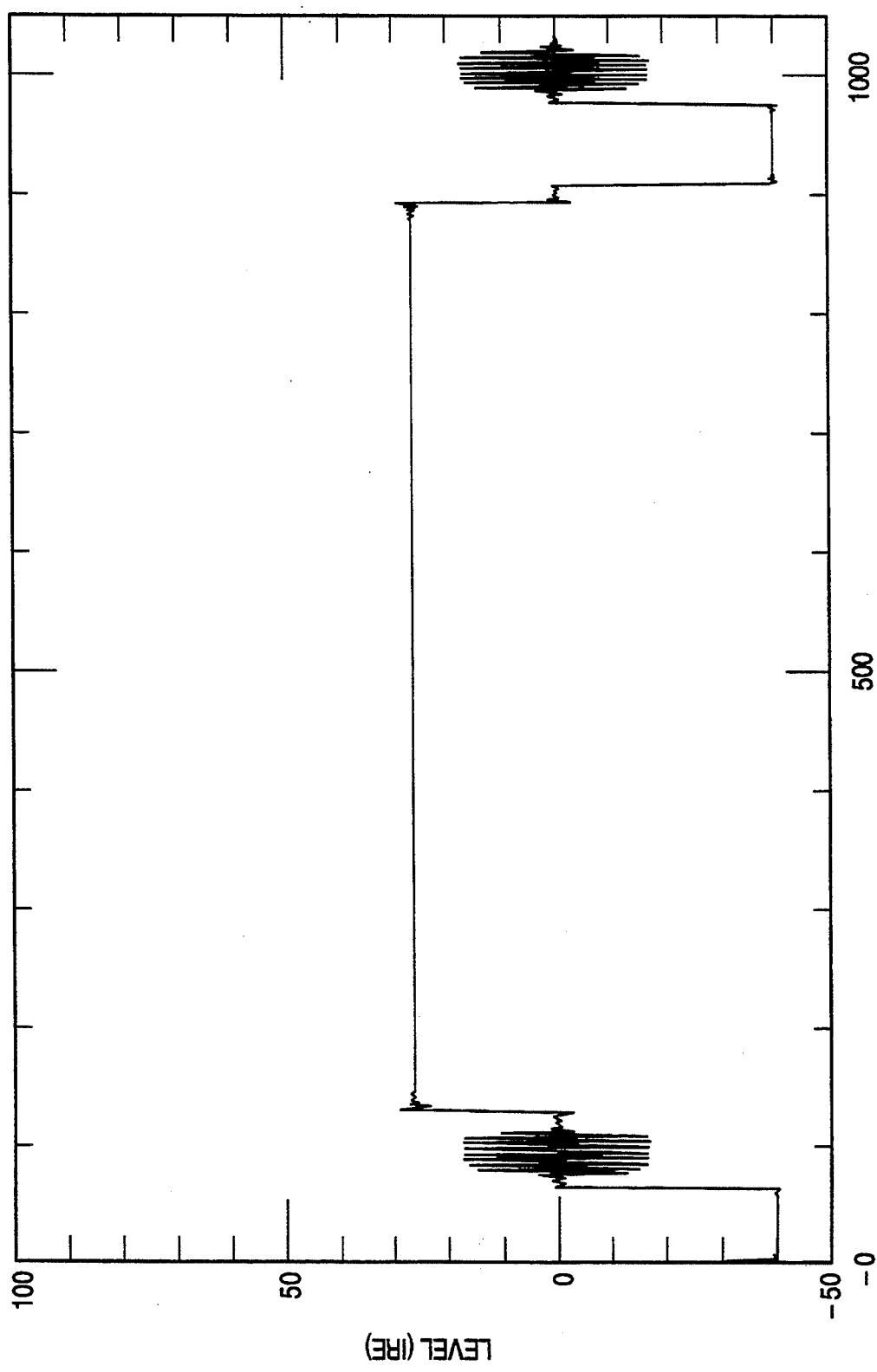
Figure 7:
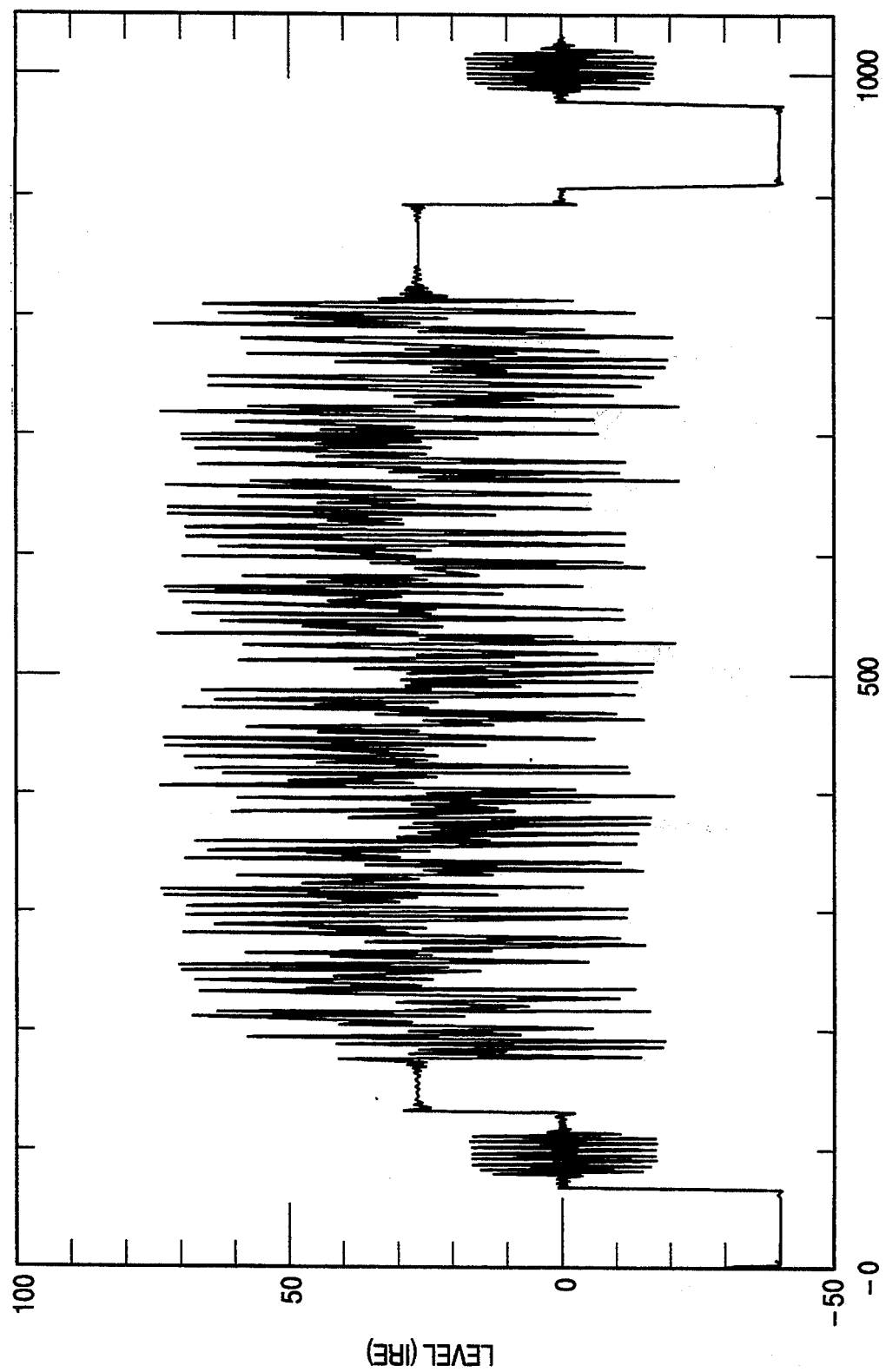
Figure 8:
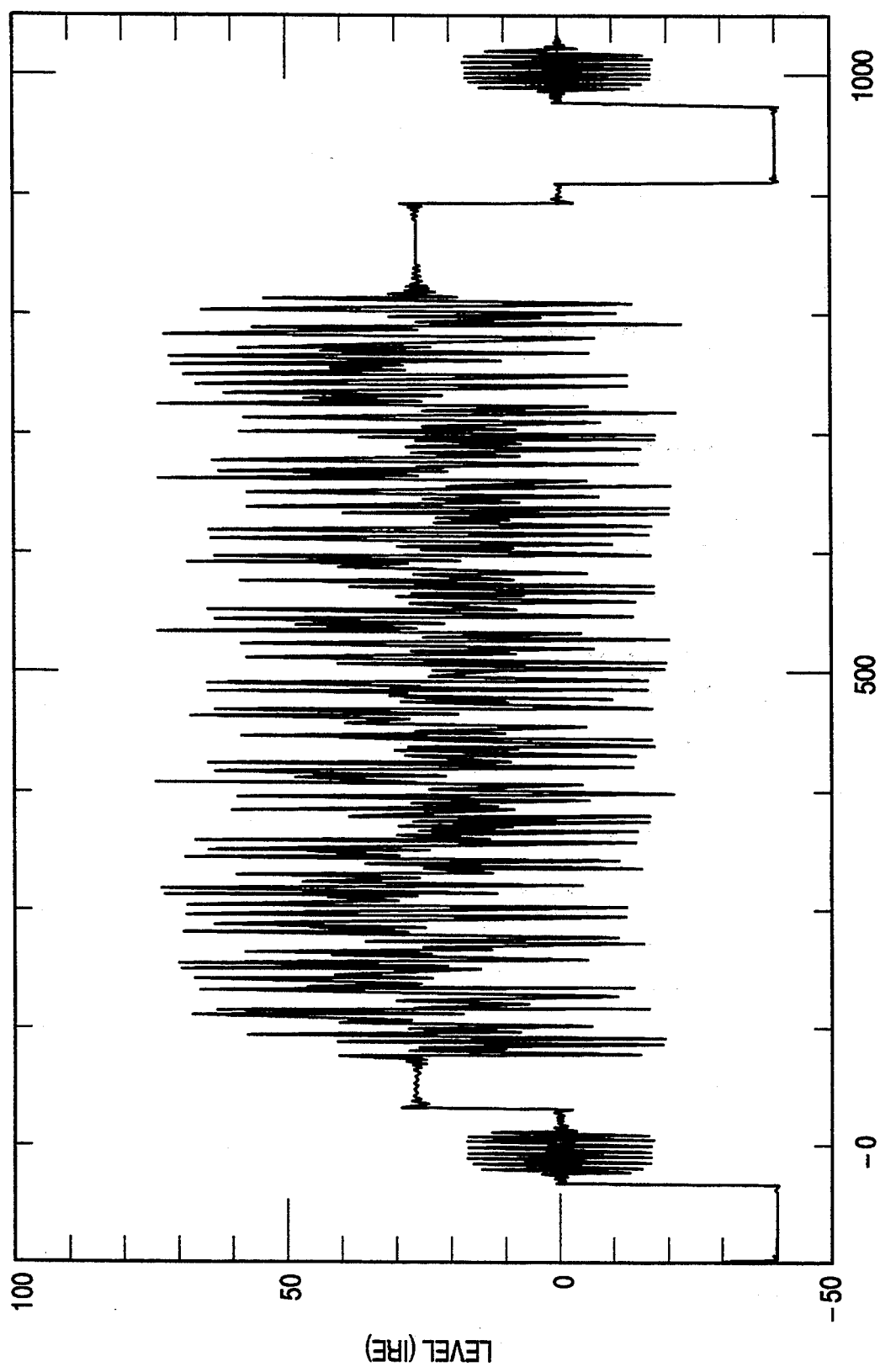

FIG. 1 shows a television transmitter 2 coupled to an antenna 4 for transmitting a television signal. A ghost cancelling reference signal generator 6 is coupled to transmitter 2, to supply to transmitter 2 a ghost-canceling signal (i.e., a predetermined training signal known as a ghost-canceling reference signal, or "GCR" signal) generated in accordance with an aspect of the invention. The GCR signal occurs during selected scan line times within the vertical blanking intervals of the television signal transmitted via antenna 4. The GCR signal will undergo the same multipath distortions during transmission as the rest of the television signal.

A representative transmitter architecture comprises a studio synchronizing signal generator, a television camera for supplying three color signals, a processing amplifier for generating composite video signal proceeding from the three color signals supplied by the camera and from synchronizing signals supplied from the studio synchronizing signal generator, apparatus for time-division multiplexing information such as the GCR signal into selected lines of the composite video signal occurring during vertical blanking intervals, a vestigial sideband amplitude-modulation radio-frequency transmitter for the composite video signal with information time-division multiplexed into the vertical blanking intervals, a frequency-modulation radio-frequency transmitter for sound, and the transmitting antenna 4 to which the AM and FM transmitters are each coupled. The AM and FM transmitters may share one or more final stages before the transmitting antenna 4. The camera has the scanning of images from its photosensing portions controlled by scanning signals from the studio synchronizing signal generator.

The studio synchronizing signal generator typically includes a crystal-controlled oscillator for generating oscillations at a multiple of color carrier frequency, together with a binary counter chain for counting the oscillations and for dividing the count to generate counts of the scan lines in each field scan, and to generate counts of the field scans modulo eight. These elements are combined with appropriate blanking circuitry to generate timing signals for standard horizontal and vertical scan synchronization pulses together with appropriately inserted equalizing pulses, to generate chroma burst, and to generate windowing pulses indicative of the active portions of scanning lines as occur between synchronizing intervals. The processing amplifier responds to these signals to generate suitable pedestals in the composite video signals. The oscillations per scan line can be counted in the studio synchronizing signal generator and used together with the modular field count to address a read-only memory that stores the ghost cancellation reference signal in digitized form. An analog-to-digital converter can convert the digitized GCR signal to analog form to be time-division multiplexed into the active portion of a scan line in the vertical blanking interval that is selected by the scan line counter in the studio synchronizing signal generator.

By way of example, a pair of complementary sequences of length 640 constructed by methods described above has been considered as the basis for a GCR signal. For transmission, the sequences must be shaped to yield (ideally) a flat spectrum over a 4.2 MHz band. A raised-cosine shaping filter with 2% roll-off has been used for this purpose. The resulting (sin x)/x shape of the transitions increases the length of the shaping-filter response to the 640 sample complementary-sequences to ≈53.3 μs duration, corresponding to 728 $f_C$-rate samples. Other complementary-sequence pairs of desirable sample lengths (e.g. 340, 590, 720, 800 etc.) may be considered as the basis for a GCR signal.

FIG. 1 shows a receiving antenna 8 receiving portions of the radio-frequency signal transmitted from the broadcast antenna 4 via a direct transmission path 10 and a multipath 12. The receiving antenna 8 supplies the received portions of the signal to a television receiver 20 and, more particularly, to a radio-frequency amplifier 21 therein. The r-f amplifier 21 supplies amplified response to the received television signals to a converter 22, which responds to supply an intermediate-frequency signal to an intermediate-frequency amplifier 23. The amplified i-f response from the i-f amplifier 23 is supplied to a video detector 24 and to a sound detector 25. The sound detector 25, which may be of intercarrier type, supplies detected sound signal to a sound amplifier 26, which supplies audio power to a loudspeaker 27. Alternatively, the sound detector may be followed by a stereophonic sound detector, two sound ampliers and right and left loudspeakers.

The video detector 24 supplies composite video signal to an analog-to-digital converter 28 and to synchronizing-signal and color-burst separation circuitry 29. Circuitry 29 is associated with clock regeneration circuitry 30, in which circuitry 30 a phase- and frequency-controlled crystal oscillator is locked to a multiple of the separated color burst frequency, and in which circuitry 30 digital counters are arranged to perform frequency division. The circuitry 30 supplies, at a rate typically four times the color subcarrier frequency $f_c$, a digital clock signal to the analog-to-digital converter 28, to digital filters in deghosting circuitry 50, and to a chroma demodulator 31. The digital counters in the clock regeneration circuitry 30 supply the deghosting circuitry 50 with scan line count information for each successive field, with which to gate the acquisition of GCR signals. The digital counters in the clock regeneration circuitry 30 may also supply the deghosting circuitry 50 with field count information to gate further the acquisition of GCR signals.

Figure 10:
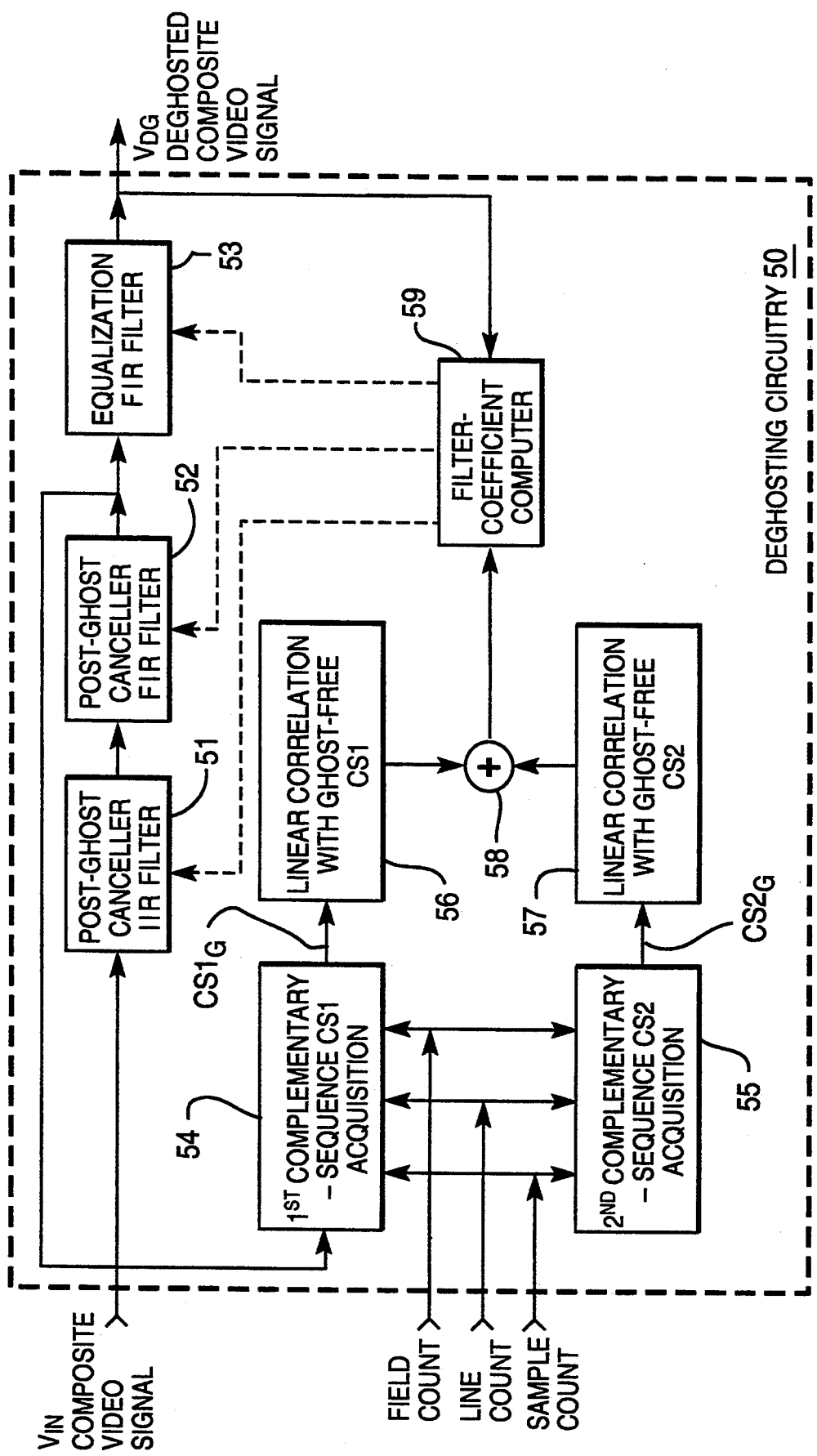
FIG. 10 is a schematic diagram illustrating in greater detail the deghosting circuitry of the FIG. 1 television receiver, which deghosting circuitry is constructed in accordance with an aspect of the invention.

The deghosting circuitry 50, which embodies an aspect of the invention and is shown in greater detail in FIG. 10, attenuates or eliminates ghost images to provide a "deghosted" digital composite video signal $V_{DG}$. $V_{DG}$ could be converted to analog form so the rest of the video processing could be carried out in the analog regime.

FIG. 1 shows instead the "deghosted" digital composite video signal $V_{DG}$ being further processed in the digital regime. A digital luma/chroma separator 32, as may employ digital comb filtering, supplies digital chrominance signal to the chroma demodulator 31, which demodulator 31 is operative in the digital regime to supply a pair of digital color-difference signals to analog-to-digital converters 33 and 34, respectively. The luma/chroma separator 32 supplies digital luminance signal to an analog-to-digital converter 35. The analog responses from the analog-to-digital converters 33, 34 and 35 are supplied to color matrix circuitry 36 there to be combined to generate red (R), green (G) and blue (B) signals respectively amplified by amplifiers 37, 38 and 39 to provide R, G and B drive signals for electron guns in a color kinescope 40. The color kinescope 40 has horizontal and vertical deflection coils 41 and 42 for deflecting the electron beams from its guns to trace a raster on its screen. Delection circuitry 43 responds to horizontal and vertical synchronization pulses from the separator circuitry 29 to supply suitable deflection signals to the deflection coils 41 and 42 for tracing a raster on the kinescope 40 screen.

A GCR signal that spans an eight-field cycle and that can be separated from a four-field sequence of test signals S1, S2, S3, S4 may be constructed from signals of the type exemplified in FIGS. 2–5 in accordance with the table set forth in FIG. 6.

The processing algorithm carried out during the acquisition of the ghosted version $CS1_G$ of the nonghosted first complementary-sequence CS1 is as follows:

$$CS1_G=[(F1+F6)-(F2+F5)]/2. \qquad (2)$$

The (F1+F6) and (F2+F5) summations have color burst components cancelled from each of them, so that color burst does not accompany $CS1_G$ signal recovered from each 8-field cycle, but pedestal, horizontal-sync-pulse and porch components add in each summation. The (F1+F6) summation contains double-in-amplitude $CS1_G$ signal, pedestal, horizontal-sync-pulse and porch components. The (F2+F5) summation, which contains no $CS1_G$ signal component, contains doubled-in-amplitude pedestal, horizontal-sync-pulse and porch components to cancel the corresponding components in the (F1+F6) summation when these summations are differentially combined. The doubled-in-amplitude $CS1_G$ signal is all that remains as a result of this differential combination.

The processing algorithm carried out during the acquisition of the ghosted version $CS2_G$ of the nonghosted second complementary-sequence CS2 is as follows:

$$CS2_G=[(F3+F8)-(F4+F7)]/2. \qquad (3)$$

The (F3+F8) and (F4+F7) summations have color burst components cancelled from each of them, so that color burst does not accompany $CS2_G$ signal recovered from each 8-field cycle, but pedestal, horizontal-sync-pulse and porch components add in each summation. The (F3+F8) summation contains doubled-in-amplitude $CS2_G$ signal, pedestal, horizontal-sync-pulse and porch components. The (F4+F7) summation, which contains no $CS2_G$ signal component, contains doubled-in-amplitude pedestal, horizontal-sync-pulse and porch components to cancel the corresponding components in the (F3+F8) summation when these summations are differentially combined. The doubled-in-amplitude $CS2_G$ signal is all that remains as a result of this differential combination.

The channel characterization result is generated as $$[(CS1_G*CS1)+(CS2_G*CS2)]/2 \qquad (4)$$

wherein * denotes linear convolution.

A GCR signal that spans an eight-field cycle and that can be separated from a four-field sequence of test signals S1, S2, S3, S4 may be constructed from signals of the type exemplified in FIGS. 2, 7, 4 and 8 in accordance with the table set forth in FIG. 9. The processing algorithm carried out during the acquisition of the ghosted version $CS1_G$ of the non-ghosted first complementary-sequence CS1 is as follows:

$$CS1_G=[(F1+F6)-(F2+F5)]/4. \quad (5)$$

The (F1+F6) and (F2+F5) summations have color burst components cancelled from each of them, so that color burst does not accompany $CS1_G$ signal recovered from each 8-field cycle, but pedestal, horizontal-sync-pulse and porch components add in each summation. The (F1+F6) summation contains doubled-in-amplitude positive-sense $CS1_G$ signal, pedestal, horizontal sync pulse and porch components. The (F2+F5) summation contains doubled-in-amplitude pedestal, horizontal-sync-pulse and porch components to cancel the corresponding components in the (F1+F6) summation when these summations are differentially combined. With this GCR signal the (F2+F5) summation also contains doubled-in-amplitude negative-sense $CS1_G$ signal. Therefore, a quadrupled-in-amplitude $CS1_G$ signal results from this differential combination.

The processing algorithm carried out during the acquisition of the ghosted version $CS2_G$ of the non-ghosted second complementary-sequence CS2 is as follows:

$$CS2_G=[(F3+F8)-(F4+F7)]/4. \quad (6)$$

The (F3+F8) and (F4+F7) summations have color burst components cancelled from each of them, so that color burst does not accompany $CS2_G$ signal recovered from each 8-field cycle, but pedestal, horizontal-sync-pulse and porch components add in each summation. The (F3+F8) summation contains doubled-in-amplitude positive-sense $CS2_G$ signal, pedestal, horizontal-sync-pulse and porch components. The (F4+F7) summation contains double-in-amplitude pedestal, horizontal-sync-pulse and porch components to cancel the corresponding components in the (F3+F8) summation when these summations are differentially combined. With this GCR signal the (F4+F7) summation also contains doubled-in-amplitude negative-sense $CS2_G$ signal. Therefore, a quadrupled-in-amplitude $CS2_G$ signal results from this differential combination.

The channel characterization result is still generated as $$[(CS1_G*CS1)+(CS2_G*CS2)]/2 \quad (7)$$

wherein * denotes linear convolution. The same amplitude channel characterization result is generated as for the previously considered GCR signal, but the division by four in equations 5 and 6 (rather than the division by two as in equations 2 and 3) halves respective noise power, allowing ghost cancellation better to proceed when the transmission signal is somewhat noisy.

GCR signals constructed in accordance with the principles of the invention, but occuring over only a four-field cycle, will allow for the pair-wise cancellation of only two test signals as inserted into an adjoining VBI scan line. To secure adequate signal-to-noise int he acquisition of CS1 and CS2 signals under most conditions of usable TV reception, however, integration of corresponding samples of each of the CS1 and CS2 signals over four VBI scan lines is advisable, however.

The inventors currently prefer that the range in amplitude of either complementary-sequence in the GCR signal be primarily between $\approx 0$ IRE and $\approx 95$ IRE with the pedestal signal being $\approx 46$ IRE. This differs somewhat from the pedestal levels and GCR signal peak-to-peak swings shown in FIGS. 2–5, 7 and 8 of the drawing. The pedestal on which the peak-to-peak swings of the two complementary sequences are superposed, directly evidenced in FIGS. 6 and 7, should be optimized for the television transmission environment. For example, with the expected ghost levels, neither should the negative excursions adversely affect the television synchronizing circuits nor should the positive excursions cause an unacceptable over-modulation. The pedestal value can be raised or lowered based on the results of the field and lab tests without affecting the intended function of a GCR signal. With "pair-wise-constant" signal processing in the VBI scan lines preceding and succeeding the VBI scan line into which the complementary-sequences are inserted as GCR signal, and with linear correlation used to generate the channel characterization, there is no inherent limitation on the range of pre-ghosts and post-ghosts; that is, the ghosts are unambiguously indicated.

FIG. 10 shows the deghosting circuitry 50 in greater detail. Digital composite video signal supplied from the analog-to-digital converter 28 is applied as input signal to the cascade connection of an infinite-impulse-response (IIR) filter 51 used to suppress macroghosts that occur after the predominant signal, a finite-impulse-response (FIR) filter 52 used to suppress macroghosts that occur before the predominant signal, and a further FIR filter 53 used to suppress microghosts. The order of the filters 51, 52 and 53 in their cascade connection can be shuffled in various modifications of the deghosting filter 50 without departing from the spirit and scope of the invention. After the operating parameters of the filters 51, 52 and 53 have been established, their cascade connection supplies a "deghosted" digital composite video signal $V_{DG}$ as its output response to the ghosted digital composite video signal $V_{IN}$ supplied from the analog-to-digital converter 28.

Acquisition circuitry 54 responds to field count and to scan line count within the current field, as supplied from the clock regeneration circuitry 30, to select and temporarily store those portions of the response from the cascaded ghost-cancelation filters 51 and 52 that contain a first of the two complementary-sequences in the GCR signal. Acquisition circuitry 54 can be similar to that used in prior-art ghost-cancellation circuitry. Acquisition circuitry 54 can comprise an even-numbered plurality of random access memories (RAMs) addressed in parallel at least during their being read, each RAM having storage capability for a respective scan line of pixel samples supplied at $4f_C$ rate. These RAMs are sequentially written during VBI scan lines containing the first complementary-sequence in the GCR signal, with at least the RAM being written being addressed by a picture element count supplied at $4f_C$ rate from the clock regeneration circuitry 30. The first complementary-sequence data read out in parallel from the RAMs are sorted in accordance with polarity; the positive-sense data are added together; the negative-sense data are added together; and the sum of the negative-sense data is subtracted from the sum of the positive-sense data to cancel pedestal, horizontal-synchronizing-signal, color-burst and porch components. The resulting difference signal is just the first complementary-sequence data. By increasing the number of RAMs, the signal-to-noise ratio of the first complementary-sequence data can be increased because the first complementary-sequence data being phase-correlated sums arithmetically when combining RAM read-out data, while noise being random-phase sums vectorally.

Acquisition circuitry 55 responds to field count and to scan line count within the current field, as supplied from the clock regeneration circuitry 30, to select and temporarily store those portions of the response from the cascaded ghost-cancelation filters 51 and 52 that contain a second of the two complementary-sequences in the GCR signal. Acquisition circuitry 55 is similar to acquisition circuitry 54 except for the write enablement of the memory that circuitry 55 uses to temporarily store the second complementary-sequence in the GCR signal.

The ghosted first complementary-sequence read from the acquisition circuitry 54 is supplied to a filter 56 for linear correlation with a non-ghosted first complementary-sequence. The linear correlation filter 56 is an FIR filter having a kernel corresponding to the non-ghosted first complementary-sequence. Since the tap weights are accordingly all either $+1$ or $-1$, the linear correlation filter 56 is conveniently configured as a tapped digital delay line to which samples of the ghosted first complementary-sequence are sequentially supplied in line scan order, a first plural-input digital adder for summing all the tap signals to be weighted by $+1$, a second plural-input digital adder for summing all the tap signals to be weighted by $-1$, and a dual-input digital subtractor for subtracting the sum supplied by the second adder from the sum supplied by the first adder.

The ghosted second complementary-sequence read from the acquisition circuitry 55 is supplied to a filter 57 for linear correlation with a non-ghosted second complementary-sequence. The linear correlation filter 57 is an FIR filter having a kernel corresponding to the non-ghosted second complementary-sequence. Since the tap weights are accordingly all either $+1$ or $-1$, the linear correlation filter 57 is also conveniently configured as a tapped digital delay line, two plural-input digital adders, and a dual-input digital subtractor.

The correlation results from the linear correlation filters 56 and 57 are generated parallelly in time and are added in a digital adder 58. A new set of correlation results can be generated each frame, for transfer into the memory of a filter-coefficient computer 59 included within the deghosting circuitry 50, such transfer either being made at a time other than a VBI scan line in which the acquisition circuits 54 and 55 receives a GCR signal component or during such a VBI scan line operating one of the line stores in the acquisition circuits 54 and 55 on a read-then-write basis.

The components of GCR signals constructed in accordance with the invention can be placed on any VBI line, although line 19 of each successive field is currently preferred. The signal content of other VBI lines either previous or subsequent to the VBI lines containing components of the complementary-sequence GCR signal should be constant in the sense of "pair-wise-constant" signal processing. Extended deghosting range with this complementary-sequence signal is dictated by these VBI lines. The complementary-sequence GCR signal, without ensuing pair-wise-constant VBI lines, has $\approx 12$ $\mu s$ range for the post-ghost attenuation which is equal to the front-porch, sync and burst duration. With the complementary-sequence signal on VBI line 18 (like BTA), the deghosting range will be $\approx 75$ $\mu s$ (the 63.5 $\mu s$ duration of the VIR in line 19 plus the 12 $\mu s$ dration of the sync and burst region of the succeeding line).

The complementary-sequence GCR signal is such that the computer 59 software can compute the locations and magnitudes of leading echoes $\leq 10$ $\mu S$ (back porch with chroma burst, horizontal sync and front-porch). Leading echoes which are outside this range will not be canceled. A 128-tap FIR filter 52 is used to attenuate all leading echoes over a range that depends on the number of leading ghosts.

The filter-coefficient computer 59 is arranged so that, after the operating parameters of the ghost-cancelling filters 51 and 52 have been calculated, it can write into its internal memory the response of the equalization filter 53 to a portion of the GCR signal. This response is then adaptively adjusted to correspond with an ideal response permanently stored within the computer 59, thereby to establish an ideal amplitude response for the cascade connection of filters 51, 52 and 53. This ideal response could be one that is optimally flat across the video band, but an ideal response that exhibits some high-frequency peaking is subjectively more pleasing to most viewers.

In an alternative arrangement, rather than writing directly into the computer 59 the response of the equalization filter 53 to a portion of the GCR signal, the computer 59 may be written with response to a portion of the GCR signal taken from a point further on in the television receiver. This allows the amplitude-equalization procedure to compensate for roll-offs that may occur further on in the television receiver.

One skilled in the art of digital filter design will appreciate that the linear correlation filters 56 and 57 can each be constructed as an input-weighted FIR filter using a respective cascade connection of clocked digital adder/subtractor circuits with dual input ports. Further, such linear correlation filters 56 and 57 and the adder 58 can be replaced by an equivalent circuit consisting of a single cascade connection of clocked digital adder/subtractor circuits each with three input ports. These and other filter design variants are to be considered to be within the scope and spirit of the invention.

A ghosted signal is the sum of the transmitted signal and its ghosted components of various (lower) amplitudes and phases. Therefore, its deghosted version will be of lower peak-to peak amplitude, so the effective number of bits of resolution in the deghosted signal will be lower than that resulting from digitizing an equal peak-to-peak amplitude unghosted video signal. This should be considered in selecting the precision of the analog-to-digital converter 28. The linearity of the analog-to-digital converter 28 is extremely important for good deghosting performance and must be commensurate with the precision chosen. Ghost-canceling circuitry 50 has been successfully operated using a ten-bit analog-to-digital converter 28 manufactured by TRW, with only nine-bits of its output signal resolution being used, and with care being taken in providing automatic gain control (AGC) and d-c restoration of video detector 24 composite video output signal. In order to adequately attenuate the ghosts, the filters 51 and 52 should have a larger number of bits in their weighting coefficients than the input/output signals have. The filters may be satisfactorily implemented with only nine-bit precision.

Consideration of some of the theoretical background of ghost cancellation procedure using complementary sequences will make clearer the operations that the computer 59 is called upon to perform. The terrestrial multi-path channel is assumed to be band limited to (−B,B) in frequency, admitting an impulse response given by $$h_C(t) = \sum_{i=0}^{M-1} a_i \delta(t - \tau_i) * 2B\,\text{sinc}\,(2Bt) \qquad (8)$$

where M is the number of discrete multi-path components, with corresponding (complex) amplitudes given by $a_i$ and delays by $\tau_i$, and where * represents convolution. In the frequency domain, this is more directly written as $$H_C(f) = \sum_{i=0}^{M-1} a_i e^{-j2\pi f \tau_i} \text{rect}(f/B) \qquad (9)$$

where rect (f/B) is unity in the interval (−B, B) and is otherwise zero.

An equivalent discrete-time channel may be obtained by sampling at $T_s \leq (\tfrac{1}{2}B)$. Denote $h_k = h(kT+\tau)$ where $\tau$ is the sampling phase. Then from equation (8), $$h_k = 2B \sum_{i=0}^{M-1} a_i \sin[2\pi B(kT_s + \tau \cdot \tau_i)]/2\pi B(kT_s + \tau - \tau_i) \qquad (10)$$

Some insight into the above result is obtained by considering the special case: $\tau = 0$ (no sampling offset) and $t_i = iT_s$ (the ghosts are located at integer multiples of the sampling instants). Then $$h_k = 2B \sum_{i=0}^{M-1} a_i \sin[2\pi B(k-i)T_s]/2\pi B(k-i)T_s \qquad (11)$$

Further assuming Nyquist sampling where $T_s = \tfrac{1}{2}B$, equation (11) further reduces to the expected result that $h_k = 2Ba_k$. That is, the discrete-time equivalent channel is FIR with coefficients (except for an unimportant scale factor, which is for the moment ignored) being equal to the multi-path amplitudes at the ghost locations. However, the general result in equation (10) clearly indicates that in the presence of a sampling phase offset, the equivalent channel is IIR and requires an infinite number of coefficients. Note that, since the coefficients are obtained by interpolation using a (sin x)/x kernel, effective cancellation can be achieved by using only a few coefficients clustered around the nominal ghost location.

The correlator output from the digital adder 58 is, in general, a non-casual sequence representing the pre- (anti-causal part) and post- (causal part) ghosts, respectively. The IIR post-ghost-suppressing filter 51 and FIR pre-ghost-suppressing filter 52 coefficients can now be directly determined from these channel estimates in the manner discussed below. At this point however, it is useful to point out that while this partitioning of the estimated channel into its causal (post ghosts) and anti-causal (pre-ghosts) segments is conceptually convenient (and rational, in that the effect of the channel is viewed as introducing a few prominent replicas of the transmitted video that need to be cancelled or otherwise compensated), the deghoster implementation based on this view also leads to (undesirable) coupling of the two functions. This point does not appear to have been sufficiently recognized and is discussed in some detail below.

The architecture chosen for the deghosting circuitry is an IIR-FIR cascade where an initial recursive, or IIR, filter section primarily cancels (far) post-ghosts. The output response of an initial IIR section is then predominantly contaminated by pre-ghosts and near post-ghosts, the effects of which are counteracted by the FIR section. Thus, the FIR section not only compensates for the high-frequency roll-off caused by microghosts (i.e., does waveform equalization), but also attenuates all pre-ghosts. This task is most effectively divided into two FIR sections: the first section attenuates pre-ghosts and the second section is adaptively adjusted to equalize the deghosted video signal. The response of the initial IIR section also contains weak spurious responses, referred to as "higher-order ghosts", caused by the recursive processing of pre-ghosts therein.

For optimum performance, the IIR section should be continuous (i.e., have contiguous non-zero taps) so that it can cancel all post ghosts within the span of the filter. This necessitates an extremely long and expensive IIR section for practical ranges further, cancellation of a few prominent post ghosts leads to the greatest improvement in visual quality. This latter reasoning leads to the implementation of the IIR section as a sparse filter, consisting of six sections each having eight taps. Each section is positioned at a prominent post-ghost location using a programmable bulk delay determined by examining the peaks of channel impulse response, thereby allowing attenuation of the six strongest post-ghosts by this method. In one of the inventors' designs the pre-ghost cancelation filter 52 is a 128-tap FIR filter and is followed by a 32-tap FIR equalization filter 53. An equalization filter 53 with as few as fifteen taps is believed to be commercially satisfactory, however.

The post-ghost canceller operates on a very simple principle: the reference peak $\theta(n)$ is delayed and weighted by the casual channel estimates and subtracted from the received video to cancel the post-ghosts. This naturally leads to an IIR post-ghost canceller the coefficients of which are simply the casual samples at the output of the correlator. However, the correlator output should not be copied directly into the IIR section, as can be seen by considering the case of a single post-ghost where, for simplicity, we assume that the ghost is located at a sampling instant (i.e., $\tau = kT_s$, where $T_s = \tfrac{1}{2}f_C$). Then the output of the correlator supplied by the adder 58 may be written as $$y_o(n) = \text{sinc}\,(2nWT_s) * [\delta(n) + a\delta(n-k)] \qquad (12)$$

where sinc $(2nWT_s)$ is the impulse response of the (discrete-time) correlator, and W=4.2 MHz corresponds to the video bandwidth. This band-limiting to the video bandwidth has two effects:

(i) It spreads the ideal reference $\delta(n)$ into sinc (2nW), leading to possible ambiguities in synchronization and ghost location, particularly in the presence of near ghosts; and (ii) As evident from equation (12), direct use of the correlator output samples as the IIR coefficients leads to a frequency response that is very large for the frequency range extending upward from 4.2 MHz to the 7.32 MHz Nyquist rate associated with $\tfrac{1}{2}f_C$ sampling, implying noise enhancement at the filter output and possible filter instability.

To avoid this potential problem, the IIR coefficients are determined by modifying the correlator output in the simple manner described next.

(i) Remove V samples on either side of the main peak of the correlator output (equation 12) as supplied to the computer 59 from the adder 58, leaving only a reference peak at $\delta(n)$ (approximately).

(ii) Scale the rest of the samples by A.

For V sufficiently large, the resulting signal can be expressed as $$\tilde{y}_o(n) = \delta(n) + A\alpha\delta[n-k] * \text{sinc}(2WT_s n) \qquad (13)$$

In practice, V = 15 has been found to be quite adequate. If A is chosen to be $$A = \frac{1}{\{\text{sinc}[2WT_s n]\}|_{f=0}} = 2WT \qquad (14)$$

Denoting the spectra of $y_o(n)$ and $\bar{y}_o(n)$ as $Y_o(f)$ and $\bar{Y}_o(f)$, respectively, it can be shown that:

$$\tilde{Y}_o(f) = AY_o(f) \text{ for } |f| < 4.2 \text{ MHz and} = 1 \text{ otherwise.} \qquad (15)$$

In equation 15 Yo(f) and $\bar{Y}_o$(f) are the spectrum of the $y_o$(n) and $\bar{y}_o$(n) respectively. It is clear from equation (15) that the modified correlator output has the same spectrum (except for an unimportant constant factor) within the 4.2 MHz video band, while maintaining a finite gain over the frequency range extending upward from 4.2 MHz to the frequency range extending upward from 4.2 MHz to the 7.32 MHz 7.32 MHz. The possibility of noise enhancement and filter instability is thereby eliminated.

Based on the above, the IIR coefficients are determined using $[\bar{y}_o(n)]_+$, the segment with positive delays of $\bar{y}_o(n)$; i.e., using z-transforms $$H_{IIR}(z) = \frac{1}{1 + [\tilde{y_o}(z)]_+} \approx \frac{1}{1 + a(z)}. \qquad (16)$$

The coefficients for the FIR pre-ghost canceller section are determined similarly, proceeding from the segment of negative delays of $y_o$(n), i.e., $$\begin{aligned} H_{FIR}(z) &= \frac{1}{1 + [\tilde{y_o}(z)]_-} \\ &= 1 - [\tilde{y_o}(z)]_- + \ldots \\ &= 1 + b(z) \end{aligned} \qquad (17)$$

where, in practice, the infinite series in equation (17) is truncated to a finite number of taps.

It is clear from the above that near ghosts that lie in the range $-V < n < V$ are not attenuated by the above procedure. The effect of such ghosts are counteracted by the second FIR section which also compensates for any residual high frequency roll-off that may occur due to impairments such as antenna mistuning. The coefficients of this FIR section are most conveniently optimized in an adaptive manner, employing the well-known least-mean square (LMS) algorithm. Samples of the filtered GCR signal (filtered thru an ideal low-pass filter over the video band of 4.2 MHz) can be pre-stored and used as the reference signal which is required in least-mean-squares adaptation. The filter used to generate this GCR for adaptive processing can be in such that it represents optimum transient response in the band-limited television system.

In the above discussion, the FIR and IIR canceller sections are fundamentally non-adaptive and configured to independently attenuate pre- and post-ghosts. In so doing, weaker 'higher order' pre- and post-ghosts are generated due to the cross-interaction between the two sections. To see this, consider the simple situation of a single pre- and post ghost, located at $n = -n_1$, $n = n_2$ respectively. Ignoring the effects of any band-limiting, the output of the ghost-channel is then given by the normalized channel impulse response $$r(n) = h_c(n) = \alpha_1\delta(n+n_1) + \delta(n) + \alpha_2\delta(n-n_2) \qquad (18)$$

where $|\alpha_1, \alpha_2| < 1$ are the respective ghost coefficients. Assuming perfect channel identification, the post-ghost canceller section for the above is given by $$H_{IIR}(z) = 1/(1 + \alpha_2 z^{-n_2}) \qquad (19)$$

When the received signal r(n) is passed through $H_{IIR}(z)$, the z-transform of the resultant output signal y(n) is given by $$\begin{aligned} Y(z) &= R(z)H_{IIR}(z) = 1 + \frac{\alpha_1 z^{n_1}}{1 + \alpha_2 z^{-n_2}} \\ &= 1 + \alpha_1 z^{n_1} + \Sigma_{k \geq 1} \alpha_1(-\alpha)^k z^{n_1 - kn_2} \end{aligned} \qquad (20)$$

It is clear from the above that the IIR output consists of the uncancelled pre-ghost plus other ghosts that are created due to the cross-interaction of the pre-ghost with the IIR filter 51 which were not present at the deghoster input. These secondary or 'higher order' ghosts are weaker than their primary counterparts from which they are generated, and it usually suffices to cancel the first few such ghosts, i.e., noticeable improvement in visual quality is achieved by suppression of those at k = 1, 2. Note that most of the new ghosts created are post-ghosts that must be cancelled by appropriate modification of the IIR filter coefficients.

A quasi-adaptive procedure that adjusts the (previously non-adaptive) IIR and FIR coefficients for higher order ghost cancellation is described next. The deghosted received signal can be re-acquired after the first pass and the same channel characterization procedure described above applied again. The 'new' channel coefficients that are obtained can be conveniently interpreted as representing the impulse response of corrective IIR and FIR filters in cascade with the quiescent values obtained in the previous pass; i.e., $$H_{IIR}^{k+1}(z) = H_{IIR}^k(z) \cdot \Delta H_{IIR}^k(z) \qquad (21)$$

$$H_{FIR}^{k+1}(z) = H_{FIR}^k(z) \cdot \Delta H_{FIR}^k(z) \qquad (22)$$

where the superscript k or k+1 denotes the number of passes or iterations. In practice, only small corrections to the quiescent coefficient values obtained from the first channel characterization will be necessary, since the higher order ghosts are usually much weaker than the primary ghosts. Thus, the update operation can be simplified to $$a^{(k+1)} = a^{(k)} + \Delta a^k \qquad (23)$$

$$b^{(k+1)} = b^{(k)} + \Delta b^k \qquad (24)$$

using the approximation $[1+h^{(k)}]\cdot[1+\Delta h^k]\approx 1+h^{(k)}+\Delta h^k$, which is valid for small $h^{(k)}$ and small $\Delta h^k$. This implies that updating of the filter coefficients is achieved by additive first-order corrections to the present values via repeated characterizations of the current deghoster output.

Note that in principle, the above approximation may lead to IIR filter instability. A simple stability check (such as the one suggested by T. S. Chao in a paper "Multi-path Equalization for NTSC Video by Using IIR Digital Filter" published February 1988 in IEEE Transactions on Consumer Electronics, Vol. CE-34, pp. 268–278) can be used to disable the update in such instances. Using the modified correlator output to determine the filter coefficients as previously described, such instability did not occur in any of our hardware simulations. These iterations are continued until a desired degree of ghost cancellation is obtained.

Figure 11:
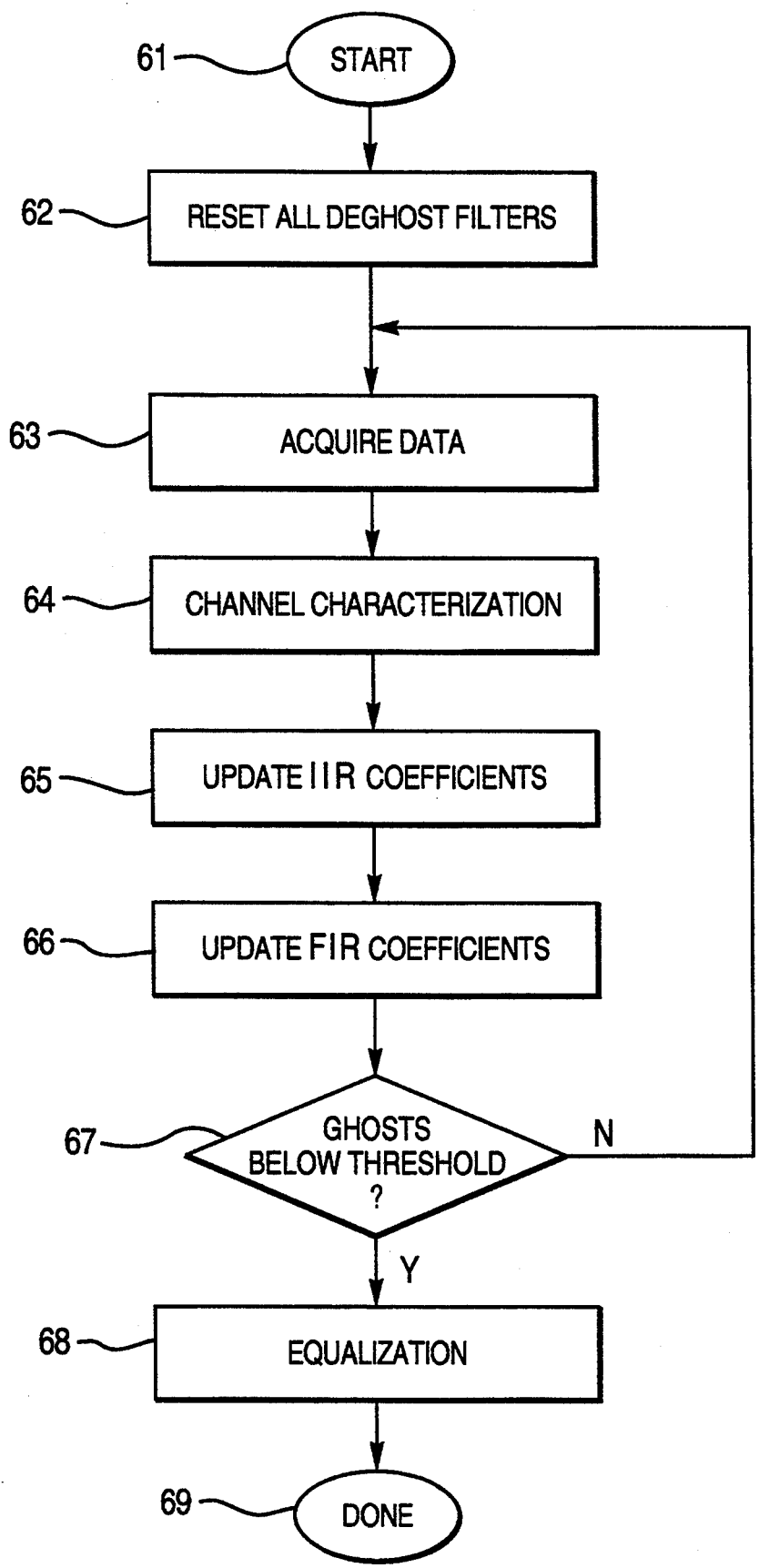
FIG. 11 is a flow diagram of the deghosting method used with the FIG. 10 deghosting filter.

FIG. 11 shows the flow diagram of the procedure for establishing the operating parameters of the filters 51, 52 and 53, which procedure is carried out by the filter-coefficient computer 59. Entry to the START condition 61 of the procedure is at the time power is turned on in the television receiver, when a new channel is tuned, or when a prescribed time has elapsed since the last deghosting procedure. A RESET ALL DEGHOST FILTERS step 62 preferably sets the filter coefficients in the filters 51, 52 and 53 to values previously determined for the channel to which the TV receiver 10 is tuned and stored in a channel-addressed memory. Alternatively, during power up or retuning the filter coefficients in the filters 51, 52 and 53 can be to values associated with a ghost-free signal; and during periodic deghosting previous values of the filter coefficients are retained during "reset". An ACQUIRE DATA step 63 then follows, which step 63 is completed after the number of fields elapse that the computer 59 must wait before first and second complementary-sequence GCR signal components issue from the acquisition circuits 54 and 55, respectively, and cause response from the correlation filters 56 and 57 that is added by the adder 58 to supply input data for the computer 59.

A CHANNEL CHARACTERIZATION step 64 then takes place. The location in time of the predominant response in the data supplied the computer 59 is detected, then the respective location in time of each successively smaller one of the significantly large ghost responses, up to the number of post-ghosts that can be suppressed by the filter 51 and up to the number of pre-ghosts that can be suppressed by the filter 52. The respective locations in time of the predominant response and multipath responses in the data supplied the computer 59 are calculated to be used as the basis for programming the bulk delay lines interspersed between the clumps of taps in the IIR filter 51 and FIR filter 52. The relative strengths of the predominant response and multipath responses in the data supplied the computer 59 are calculated to be used as the basis for assigning weights to the clumped taps.

An UPDATE IIR COEFFICIENTS step 65 is performed after the CHANNEL CHARACTERIZATION step 64 is performed. The non-zero weighting coeffients of the IIR filter 51 are updated. An UPDATE FIR COEFFICIENTS step 65 is performed after the UPDATE IIR COEFFICIENTS step 64. The non-zero weighting coeffients of the FIR filter 52 are updated. After the UPDATE IIR COEFFICIENTS and UPDATE FIR COEFFICIENTS steps 64 and 65 are performed, a decision step 67 of GHOSTS BELOW THRESHOLD? is reached. If the decision is NO, not all significant ghosts have been cancelled although the filters 51 and 52 have the capability to be further adjusted to cancel at least one more ghost, the procedure loops back to the ACQUIRE DATA step 63. A threshold −30 dB down from the predominant image has been used in step 67. If the decision is YES, all significant ghosts have been cancelled or the filters 51 and 52 do not have the capability to be further adjusted to cancel at least one more ghost, the procedure goes on to an EQUALIZATION step 68 in which weighting coefficients for the amplitude-equalization filter 53 are calculated.

The EQUALIZATION step 68 can be performed by taking the discrete Fourier transform (DFT) of the response of the cascade connection of the filters 51, 52 and 53 to the correlator response from the adder 58, then dividing it by the DFT of the ideal correlator response from the adder 58 as stored in the memory of the computer 59, thereby to obtain the basis for calculating the adjustments necessary in the tap weights of the FIR filter 53. Since the number of taps for the FIR filter 53 is no more than thirty-two, the number of spectral bins in the DFT is reasonably small; however, the DFT calculations tend to be lengthy.

An alternative, more rapid way to calculate equalization filter coefficients is to use a least-means-squares method to adjust the filter 53 weighting coefficients so that the response of the cascade connection of filters 51–53 to the correlator response from the adder 58 best fits an ideal response stored in the memory of the computer 59.

Following the EQUALIZATION step 68 the FIG. 11 procedure reaches the done condition 69 DONE. It is preferred that the UPDATE FIR COEFFICIENTS step 65 and the EQUALIZATION step 68 be performed after the UPDATE IIR COEFFICIENTS step 65 is performed, because the higher-order ghosts generated in the IIR-filtering can be accounted for before the FIR filtering coefficients are computed, so the FIR filtering coefficients can be computed so as to suppress those higher-order ghosts.

Various changes and modifications that give rise to further embodiments of the inventions will be apparent to those skilled in the art and acquainted with the foregoing disclosure. For example, while the examples used generally relate to the NTSC system, as will be apparent, the invention is readily applicable to other systems and standards, including the PAL system and so forth. It is intended that the invention be applicable to transmissions including hose by way of radio wave and those by way of cable transmission. Furthermore, various time intervals are used in the examples given; and, while such time intervals serve to illustrate the principles underlying the invention, various changes may be made without changing the basic operation. Such changes and the like are intended to be within the scope and spirit of the inventions which are defined by the claims following and their equivalents.

What is claimed is:

1. In a television receiver ghost-cancelling circuitry for utilizing a television signal of a type containing ghost-cancelling reference signals wherein first and second ones of an extended-length complementary-sequence pair are cyclically inserted into a prescribed scan line in the vertical blanking intervals of successive fields of the television signal, said ghost-cancelling circuitry comprising:

a ghost-cancelling video filter with filtering parameters that are programmable, said ghost-cancelling video filter being arranged to respond to the television signal received by said television receiver;

means for selectively acquiring the first extended-length complementary-sequence from a television signal of said type, as received by said television receiver and accompanied at times by one or more multipath responses thereto;

means for selectively acquiring the second extended-length complementary-sequence from a television signal of said type, as received by said television receiver and accompanied at times by one or more multipath responses thereto;

means for linearly correlating the selectively acquired first extended-length complementary-sequence with a ghost-free first extended-length complementary-sequence previously stored in the television receiver, to generate a first linear correlation result;

means for linearly correlating the selectively acquired second extended-length complimentary-sequence with a ghost-free second extended-length complementary-sequence previously stored in the television receiver, to generate a second linear correlation result;

means for adding said first and said second linear correlation results to generate channel characterization data; and a computer responding to said channel characterization data for programming the filtering parameters of said ghost-cancelling video filter.

2. Ghost-cancelling circuitry as set forth in claim 1, wherein said means for adding said first and said second linear correlation results to generate channel characterization data is of a type for adding said first and second linear correlation results both in positive sense.

3. Ghost-cancelling circuity as set forth in claim 1, wherein said means for linearly correlating the selectively acquired first extended-length complementary-sequence with a ghost-free first extended-length complementary-sequence previously stored in the television receiver comprises:

a first FIR digital filter having a kernel corresponding to said ghost-free first extended-length complementary-sequence; and wherein said means for linearly correlating the selectively acquired second extended-length complementary-sequence with a ghost-free first extended-length complementary-sequence previously stored in the television receiver comprises:

a second FIR digital filter having a kernel corresponding to said ghost-free second extended-length complementary-sequence.

4. Ghost-cancelling circuitry for utilizing a signal of a type wherein first and second ones of an extended-length complementary-sequence pair are inserted into said signal, said ghost-cancelling circuitry comprising:

a ghost-canceling filter with filtering parameters that are programmable, said ghost-cancelling filter being arranged to respond to said signal;

means for selectively acquiring the first extended-length complementary-sequence from said signal when said signal is of said type, as accompanied at times by one or more multipath responses thereto;

means for selectively acquiring the second extended-length complementary-sequence from said signal when said signal is of said type, as accompanied at times by one or more multipath responses thereto;

means for linearly correlating the selectively acquired first extended-length complementary-sequence with a non-ghosted prototype thereof, to generate a first linear correlation result;

means for linearly correlating the selectively acquired second extended-length complementary-sequence with a non-ghosted prototype thereof, to generate a second linear correlation result;

means for combining said first and said second linear correlation results to generate channel characterization data; and a computer responding to said channel characterization data for programming the filtering parameters of said ghost-canceling filter.

5. Ghost-canceling circuitry as set forth in claim 4, wherein said means for linearly correlating the selectively acquired first extended-length complementary-sequence with a non-ghosted prototype thereof comprises:

a first FIR digital filter having a kernel corresponding to said non-ghosted first extended-length complementary-sequence; and wherein said means for linearly correlating the selectively acquired second extended-length complementary-sequence with a non-ghosted prototype thereof comprises:

a second FIR digital filter having a kernel corresponding to said non-ghosted second extended-length complementary-sequence.

6. Ghost-cancelling circuitry as set forth in claim 4, wherein said means for combining said first and said second linear correlation results to generate channel characterization data consists of a digital adder.

7. In a television receiver ghost canceling circuitry for utilizing a television signal of a type containing ghost-cancelling reference signals wherein first and second ones of an extended-length complementary-sequence pair are cyclically inserted into a prescribed scan line in the vertical blanking intervals of successive fields of the television signal, said ghost-cancelling circuitry comprising:

a ghost-cancelling video filter parameters that are programmable, said ghost-cancelling video filter being arranged to respond to the television signal received by said television receiver;

a computer responding to channel characterization data for programming the filtering parameters of said ghost-cancelling video filter;

a digital adder for supplying said channel characterization data responsive to first and second summand signals applied thereto;

a first FIR digital filter having an input terminal, having an output terminal connected for applying said first summand signal to said digital adder, and having a kernel corresponding to a non-ghosted said first extended-length complementary-sequence;

a second FIR digital filter having an input terminal, having an output terminal connected for supplying said second summand signal to said adder, and having a kernel corresponding to a non-ghosted said second extended-length complementary-sequence;

means for selectively acquired the first extended-length complementary-sequence from a television signal of said type, as received by said television receiver and accompanied at times by one or more multipath responses thereto;

means for selectively acquiring the second extended-length complementary-sequence from a television signal of said type, as received by said television receiver and accompanied at times by one or more multipath responses thereto; and means for simultaneously applying said selectively acquiring first and second extended-length complementary-sequences to respective input terminals of said first and second FIR digital filters.

8. Ghost-cancelling circuitry as set forth in claim 7, further comprising a random access memory operated for providing said means for selectively acquiring the first extended-length complementary-sequence, said means for selectively acquiring the second extended-length complementary-sequence, and said means for simultaneously applying said selectively acquired first and second extended-length complementary-sequences to respective input terminals of said first and second FIR digital filters.

9. A ghost-cancelling procedure for a television signal containing ghost-cancelling reference signals wherein first and second ones of an extended-length complementary-sequence pair are cyclically inserted into a prescribed scan line in the vertical blanking intervals of successive fields of the television signal, said ghost-cancelling procedure comprising the steps of:

selectively acquiring the first extended-length complementary-sequence from the television signal;

selectively acquiring the second extended-length complementary-sequence from the television signal;

generating a first linear correlation result by linear correlating the selectively acquired first extended-length complementary-sequence with a ghost-free first extended-length complementary-sequence known a priori;

generating a second linear correlation result by linearly correlating the selectively acquired second extended-length complementary-sequence with a ghost-free second extended-length complementary-sequence known a priori;

generating channel characterization data by combining said first and said second linear correlation results;

computing, from said channel characterization data, ghost-cancellation filtering parameters for reducing ghosts in the television signal; and filtering the television signal in accordance with the computed ghost-cancellation filtering parameters.

10. A ghost-cancelling procedure as set forth in claim 9, wherein said step of computing filtering parameters comprises the substeps of:

computing infinite impulse response filtering parameters; and computing finite impulse response filtering parameters.

11. A ghost-cancelling procedure as set forth in claim 9, including the further step of:

determining whether ghosts are reduced below a prescribed threshold by examining the largest change in any of the filtering parameters caused by said procedure.

12. A ghost-cancelling procedure as set forth in claim 11, repeated until said step of determining whether ghosts are reduced below a prescribed threshold determines that the largest changes in any of the filtering parameters caused by repetition of said procedure is below said prescribed threshold.

13. A ghost-cancelling procedure as set forth in claim 11, repeated until said step of determining whether ghosts are reduced below a prescribed threshold determines that the largest charge in any of the filtering parameters caused by repetition of said procedure is below said prescribed threshold, at which time the following further steps are performed:

computing equalization filtering parameters for the television signal; and filtering the television signal in accordance with the computed equalization filtering parameters.

14. A ghost-cancelling procedure as set forth in claim 10, including the further step of:

determining whether ghosts are reduced below a prescribed threshold by examining the largest change in any of the filtering parameters caused by said procedure.

15. A ghost-cancelling procedure as set forth in claim 14, repeated until said step of determining whether ghosts are reduced below a prescribed threshold determines that the largest change in any of the filtering parameters caused by repetition of said procedure is below said prescribed threshold.

16. A ghost-cancelling procedure as set forth in claim 14, repeated until said step of determining whether ghosts are reduced below a prescribed threshold determines that the largest change in any of the filtering parameters caused by repetition of said procedure is below said prescribed threshold, at which time the following further steps are performed:

computing equalization filtering parameters for the television signal; and filtering the television signal in accordance with the computed equalization filtering parameters.

* * * * *

UNITED STATES PATENT AND TRADEMARK OFFICE
CERTIFICATE OF CORRECTION

PATENT NO. : 5,341,177
DATED : 23 August 1994
INVENTOR(S) : Sumit Roy, et al.

It is certified that error appears in the above-indentified patent and that said Letters Patent is hereby corrected as shown below:

Column 4,    line 62,    after "length", change "2mm" to --2mn--;

Column 9,    line 62,    after "signal-to-noise", change "int he" to --in the--;

Column 19,    line 13,    after "from", change " a " to --said--;

line 52    after "ghost-free", change "first" to --second--;

Column 21,    line 2,    after "from", change " a " to --said--;

line 7,    after "from", change " a " to --said--:

Signed and Sealed this

Fifteenth Day of October, 1996

Attest:

BRUCE LEHMAN

Attesting Officer      Commissioner of Patents and Trademarks